UNITED STATES PATENT OFFICE.

THOMAS JOHN IRELAND CRAIG, OF MANCHESTER, ENGLAND.

FIREPROOFING OF FABRICS AND OTHER ARTICLES.

1,225,414.  Specification of Letters Patent.  Patented May 8, 1917.

No Drawing.  Application filed February 6, 1915. Serial No. 6,610.

*To all whom it may concern:*

Be it known that I, THOMAS JOHN IRELAND CRAIG, a subject of the King of Great Britain and Ireland, and a resident of Manchester, in the county of Lancaster, England, have invented new and useful Improvements in and Relating to the Fireproofing of Fabrics and other Articles, of which the following is a specification.

This invention relates to improvements in the treatment of textile fibers and fabrics and other porous or absorbent substances or articles to render them less inflammable by precipitating or forming therein or thereon, a double carbonate of alumina and alkali, as, for example, the double carbonate of alumina and soda approximately represented by the formula $Al_2O_3CO_2Na_2CO_3$.

In carrying this invention into effect, the fabric or the like (hereinafter referred to as a fabric) is first immersed in or otherwise treated by known means with a solution of a suitable alkaline aluminate and then (with or without any intermediate treatment) with a liquid or solution which is a suitable source of supply of carbon dioxid and which has no or very little solvent action on the fireproofing body which I deposit in or on the fabric.

The following is an example of how I carry this invention into effect. The fabric is treated with a solution of sodium aluminate of suitable composition (*e. g.* having a molecular ratio of soda to alumina of about 1.25 molecules $Na_2O$ to 1 molecule $Al_2O_3$) and concentration (*e. g.* about 1.13 specific gravity) and which may contain a proportion of sodium carbonate (*e. g.* about 5% $Na_2CO_3$). I do not confine myself to these proportions, which are given for purposes of illustration only, but may, for example, use an aluminate with either a lower or a higher molecular ratio of $Na_2O$ to $Al_2O_3$ than 1.25 to 1, and I may employ the aluminate at a lower or a higher specific gravity than 1.13 and the proportion of sodium carbonate, if employed in the aluminate, may be below or above 5%. It is obvious that some fabrics may be capable of absorbing relatively more aluminate than others, and the strength of the aluminate solution is varied according to the requirements of the fabrics which are being impregnated with the solution of sodium aluminate. The thus treated fabric, from which any excess aluminate solution is removed by known means, *e. g.* wringing, squeezing, draining or the like, containing the necessary amount of sodium aluminate is then immersed for a few minutes or for a longer time if desired, in a hot concentrated solution of acid sodium carbonate, for example a saturated or nearly saturated solution of about 85° C. of sodium sesquicarbonate which may be at ordinary atmospheric pressure or at an increased pressure (*e. g.* about 10 lbs.) during most or part of the time of immersion. It will be understood that at ordinary atmospheric pressure the temperature of the solution may exceed 85° C., and when the solution is under a higher pressure, its temperature may exceed 100° C., if desired.

It is essential that there be in this latter solution a higher molecular proportion of carbon dioxid over soda than is required to form sodium carbonate. This is in order to supply carbon dioxid to insure the production and fixation of the fireproofing body. To obtain this fixing solution I may suitably mix sodium carbonate and sodium bicarbonate in the desired proportions or I may boil or heat sodium bicarbonate with water, or I may pass carbon dioxid gas through or into a hot strong solution of sodium carbonate. While the fabric is being treated with the acid sodium carbonate solution I may, if desired, at the same time pass carbon dioxid gas through the liquid to replace in the solution carbon dioxid absorbed by the aluminate treated fabric.

After the fireproofing body has been produced in or on the fabric by the above treatment, the excess of acid sodium carbonate is removed by known means and may be suitably recovered for re-use, *e. g.* by draining or squeezing and then washing it out of the fabric with hot or cold water.

Instead of the first bath consisting of sodium aluminate it may consist of other suitable alkaline aluminate, for example, potassium aluminate or a mixture in suitable proportions of suitable alkali aluminates. Similarly, the fixing or finishing bath may be of any other suitable acid alkali carbonate or mixtures thereof, but acid sodium carbonate is preferred on account of cost.

Before treating the aluminated fabric with acid carbonate solution, I may subject the fabric to intermediate treatment. This treatment may suitably consist in simply drying the aluminated fabric at temperatures under 100° C. by known means, or I may, with or without previous drying, subject it to a relatively high temperature between 100° C. and such high temperature as will not injure or deteriorate the fabric for its subsequent employments. I may expose the aluminated fabric to the high temperature in any known or convenient manner and in or by any known or convenient means. For example, the fabric may be treated with a heated atmosphere of air and steam, or air, or with a heated atmosphere containing carbon dioxid gas, for example, a heated atmosphere containing the products of the combustion of a suitable gas such as coal gas. Or I may (with or without a previous drying) treat the aluminated fabric with carbon dioxid gas in any known or convenient manner and in or by any known or convenient means for a suitable time under suitable conditions of pressure and temperature. For example, the aluminated fabric or the like may suitably be dried and exposed to the action of the carbon dioxid gas for a few hours or longer if desired, under a pressure of about 5 lbs. in a closed vessel at a temperature of about 50° C. The fabric is then further treated as hereinbefore described, with a liquid which is a suitable source of supply of carbon dioxid.

I do not confine myself to the exact conditions stated, which may be varied materially and which serve generally as illustrations of the methods which I may employ in the production in or on the fabric of the fireproofing body of the character described. It is also to be understood that the gaseous carbon dioxid employed may be in the form of comparatively pure carbon dioxid gas or in the form of a gas containing a suitable percentage of carbon dioxid.

After the fabric has been suitably treated as hereinbefore described, it may be washed and suitably dealt with in any desired manner, for example in the case of textile fabrics it may be dried, or dyed and dried, or dyed, dried and finished.

What I claim is:—

1. The process of treating textile fibers and fabrics and other porous or absorbent substances or articles to render them inflammable by precipitating or forming therein or thereon a double carbonate of alumina and alkali which consists in treating such a substance with a solution of a suitable alkali aluminate and then treating the aluminated substance with a suitable liquid or solution which is a source of supply of carbon dioxid, substantially as hereinbefore described.

2. The process of treating textile fibers and fabrics and other porous or absorbent substances or articles to render them less inflammable by precipitating or forming therein or thereon a double carbonate of alumina and alkali which consists in treating such a substance with a solution of suitable alkali aluminate, drying the aluminated substance and then treating it with a suitable liquid or solution which is a source of supply of carbon dioxid, substantially as hereinbefore described.

3. The process of treating textile fibers and fabrics and other porous or absorbent substances or articles to render them less inflammable by precipitating or forming therein or thereon a double carbonate of alumina and alkali which consists in treating such a substance with a solution of suitable alkali aluminate, subjecting the aluminated substance to a temperature of over 100° C. and then treating it with a suitable liquid or solution which is a source of supply of carbon dioxid, substantially as hereinbefore described.

4. The process of treating textile fibers and fabrics and other porous or absorbent substances or articles to render them less inflammable by precipitating or forming therein or thereon a double carbonate of alumina and alkali which consists in treating such a substance with a solution of suitable alkali aluminate, treating it with carbon dioxid gas, then treating it with a suitable liquid or solution which is a source of supply of carbon dioxid, substantially as hereinbefore described.

5. The process of treating textile fibers and fabrics and other porous or absorbent substances or articles to render them less inflammable by precipitating or forming therein or thereon a double carbonate of alumina and alkali which consists in treating such a substance with a solution of suitable alkali aluminate, drying the aluminated substance, treating it with carbon dioxid gas, then treating it with a suitable liquid or solution which is a source of supply of carbon dioxid, substantially as hereinbefore described.

6. The process of treating textile fibers and fabrics and other porous or absorbent substances or articles to render them less inflammable by precipitating or forming therein or thereon a double carbonate of alumina and alkali which consists in treating such a substance with a solution of suitable alkali aluminate, subjecting the aluminated substance to a temperature of over 100° C., treating it with carbon dioxid gas and then treating it with a suitable liquid or solution which is a source of supply of carbon dioxid, substantially as hereinbefore described.

7. In the process for the treatment of textile fibers and fabrics and other porous or absorbent substances or articles to render them less inflammable by precipitating or forming therein or thereon a double carbonate of alumina and alkali and in which carbon dioxid gas is used for the fixing of the double carbonate, employing the carbon dioxid gas under pressure, substantially as hereinbefore described.

8. In the process for the treatment of textile fibers and fabrics and other porous or absorbent substances or articles to render them less inflammable by precipitating or forming therein or thereon a double carbonate of alumina and alkali and in which a liquid solution which is a source of supply of carbon dioxid is used for the fixing of the double carbonate employing the liquid or solution under pressure, substantially as hereinbefore described.

9. Textile fibers and fabrics and other porous and absorbent substances or articles which have been fireproofed by the precipitation therein or thereon of a double carbonate of alumina and alkali, substantially as set forth.

In witness whereof I have hereunto set my hand in the presence of two subscribing witnesses.

THOMAS JOHN IRELAND CRAIG.

As witnesses:
 JOHN V. CONNELL,
 FRANK A. KEYS.